United States Patent [19]

Kane et al.

[11] Patent Number: 5,484,208
[45] Date of Patent: Jan. 16, 1996

[54] ELASTICALLY SUPPORTED SELF-COMPENSATING FLOW RESTRICTORS FOR OPTIMIZING HYDROSTATIC BEARING PERFORMANCE

[75] Inventors: Nathan R. Kane, Austin, Tex.; Alexander H. Slocum, Concord, N.H.

[73] Assignee: Massachusetts Institute of Technology, Cambridge, Mass.

[21] Appl. No.: 239,742

[22] Filed: May 9, 1994

[51] Int. Cl.$^6$ .................................................. F16C 32/06
[52] U.S. Cl. .................................................. 384/12
[58] Field of Search ........................... 384/12, 100, 107, 384/118, 399, 373

[56] References Cited

U.S. PATENT DOCUMENTS

| | | | |
|---|---|---|---|
| 3,582,159 | 6/1971 | Uhfenwoldt | 384/12 |
| 5,010,794 | 4/1991 | Klager | 384/12 |
| 5,104,237 | 4/1992 | Slocum | 384/100 |

*Primary Examiner*—Lenard A. Footland
*Attorney, Agent, or Firm*—Rines and Rines

[57] ABSTRACT

A hydrostatic self-compensating bearing straddling a linear bearing rail or a spindle shaft and having, in combination, opposed fluid supply pressure and collector grooves and pockets interconnected so that when a load is applied, one pocket approaches the rail or shaft while the opposite pocket moves away therefrom, allowing flow from the corresponding opposite supply grooves to the corresponding collector grooves to increase and decrease, respectively, providing compensation; each fluid supply pressure groove surrounding a self-compensating flow restrictor elastically connected with its surrounding structure, whereby, as the pressure each collector groove and its oppositely located pocket increases and decreases, respectively, a change in the differential pressure across the elastically supported restrictors causes a deflection thereof away from and toward the rail or shaft, further increasing and decreasing the pressure in the corresponding pocket to provide compensation supplemental to the first-named compensation, and with the restrictor being tunable to optimize hydrostatic bearing performance.

9 Claims, 3 Drawing Sheets

ELASTICALLY SUPPORTED SELF-COMPENSATING FLOW RESTRICTORS FOR OPTIMIZING HYDROSTATIC BEARING PERFORMANCE

The present invention relates self-compensating flow restrictors for hydrostatic bearings, being more particularly concerned with optimizing bearing performance with the aid of self compensating flow restrictors that are elastically supported.

BACKGROUND

Hydrostatic bearings have been in use for a very long time, and recent improvements in compensator design, such as discussed in U.S. Pat. Nos. 5,164,237, 5,281,032, and U.S. patent application (pending) Ser. No. 209,384 (High Speed Hydrostatic Spindle Design), providing means to allow water (or similar water-derived or related fluids herein generically referred to as 'water') to be used as a working fluid for the bearings.

The present invention allows designers to use standard design methods developed for self-compensating hydrostatic circuitry, while taking advantage of the latest design advancements, as disclosed in above mentioned patents and application, where the direction of the motion is primarily in one direction for spindles, for example, but with bi-directional motion also accommodated as is the case of linear motion bearings.

OBJECT OF THE INVENTION

It is an object of the present invention, accordingly, to provide a new and improved hydrostatic bearing that includes elastically supported self-compensating flow restrictors for optimizing performance.

This is realized through a new and improved self-compensated hydrostatic bearing circuit that maximizes performance parameters, such as stiffness, by adding a degree of freedom (variable) in the circuit that allows the designer to treat the self-compensating resistance as a variable resistance that is a function of the gap between a bearing rail or a spindle shaft and the bearing (as is always the case with a self-compensating bearing), and as a function of a spring deflection which is a function of the differential pressure across the compensator. This results in a net hardening spring behavior for the bearing which can lead to greatly increased stiffness values for the bearing, and allows the advantages of a self-compensating bearing, such as self-centering and self-cleaning, to be realized along with the high stiffness that is achievable. This objective is attained by providing an area behind a portion of the compensator, whose size is specified by the designer to achieve the desired bearing performance, that is connected to the pressure supply, such that the compensator is then elastically supported by a web of material, and hence the size of the web(s) acts as the tunable spring in the hydrostatic circuit.

A further object is to provide a novel self-compensating hydrostatic bearing employing an elastically supported self-compensating cantilevered flow restrictor.

Other and further objects are hereafter explained and more particularly delineated in the appended claims.

SUMMARY

In summary, the invention embraces a hydrostatic self-compensating bearing straddling a linear bearing rail or spindle shaft and having, in combination, opposed fluid supply pressure and collector grooves and pockets connected so that when a load is applied, one pocket approaches the rail or shaft while the opposite pocket moves away therefrom, allowing flow from the opposite supply grooves to the corresponding collector grooves to increase and decrease, respectively, providing compensation; each fluid supply pressure groove surrounding a self-compensating flow restrictor elastically connected with its surrounding structure, whereby, as the pressure in each collector groove and its oppositely located pocket increases and decreases, respectively, a net change in the differential pressure across the elastically supported restrictors causes a deflection thereof away from and toward the rail or shaft, further increasing and decreasing the pressure in the corresponding pocket to provide compensation supplemental to the first-named compensation.

Since the compensation for the hydrostatic bearings takes place between the restrictors and the rail or shaft, the system is insensitive to manufacturing tolerances, and movement of the shaft or rail causes any dirt that is introduced into the system to be sheared away by relevant motion between the shaft or rail and the housing, which results in the system being self-cleaning and insensitive to clogging materials that would otherwise destroy diaphragm, capillary or orifice prior art restrictors. When designed using mathematical optimization techniques latter explained, it becomes possible to tune the bearing with the elastically supported self-compensating flow restrictors to optimize stiffness, bearing size, load capacity, and/or flow characteristics with far greater variances then is possible with conventional self compensation or elastic diaphragm means.

Preferred and best mode designs are hereinafter described.

DRAWINGS

The invention will now be described with reference to the accompanying drawing in which.

PREFERRED EMBODIMENT OF THE INVENTION

In general, precision hydrostatic bearings can be used to support a shaft in a spindle or a carriage on a bearing rail. Hydrostatic bearings have been in use for a very long time, and recent improvements in compensator design, such as discussed in the before cited patents and patent application, provide means to allow water to be used as a working fluid for the bearings, as before stated.

Figure 3:
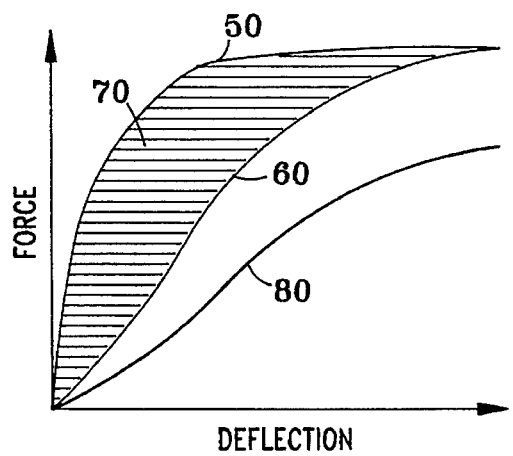
FIG. 3 is plot of the type of stiffness improvement that a self-compensated bearing provides over a conventional fixed compensation design, and the further increased improvement that an elastically supported self-compensating flow restrictor bearing provides.
Figure 4:
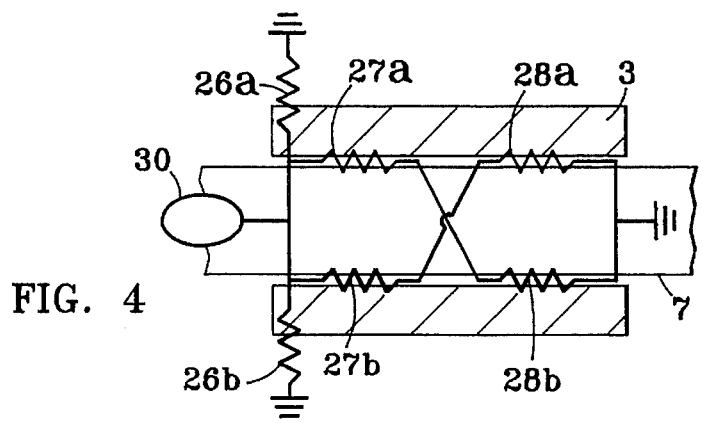
FIG. 4 is a schematic of the resistance diagram that accompanies the analysis described herein.

As shown in FIG. 3, different levels of stiffness can be achieved with conventional (fixed capillary) and self-compensated hydrostatic bearings. However, for precision machines, there is always a need for more stiffness, even when greater load capacity is not necessarily required. An example would be in precision surface grinding. The self-compensating principle is, in effect, a first-order proportional feedback system as shown in FIG. 4. What is needed to further increase the system stiffness is the effect of a variable gain or an integrator function. This requires that the resistance not only be a function of the bearing gaps 6a and 6b in FIG. 1, but also of the differential pressure between a fluid pressure source 11a and the pressure in a collector 8a acting on the stiffness of the compensator structure 9a.

Figure 1:
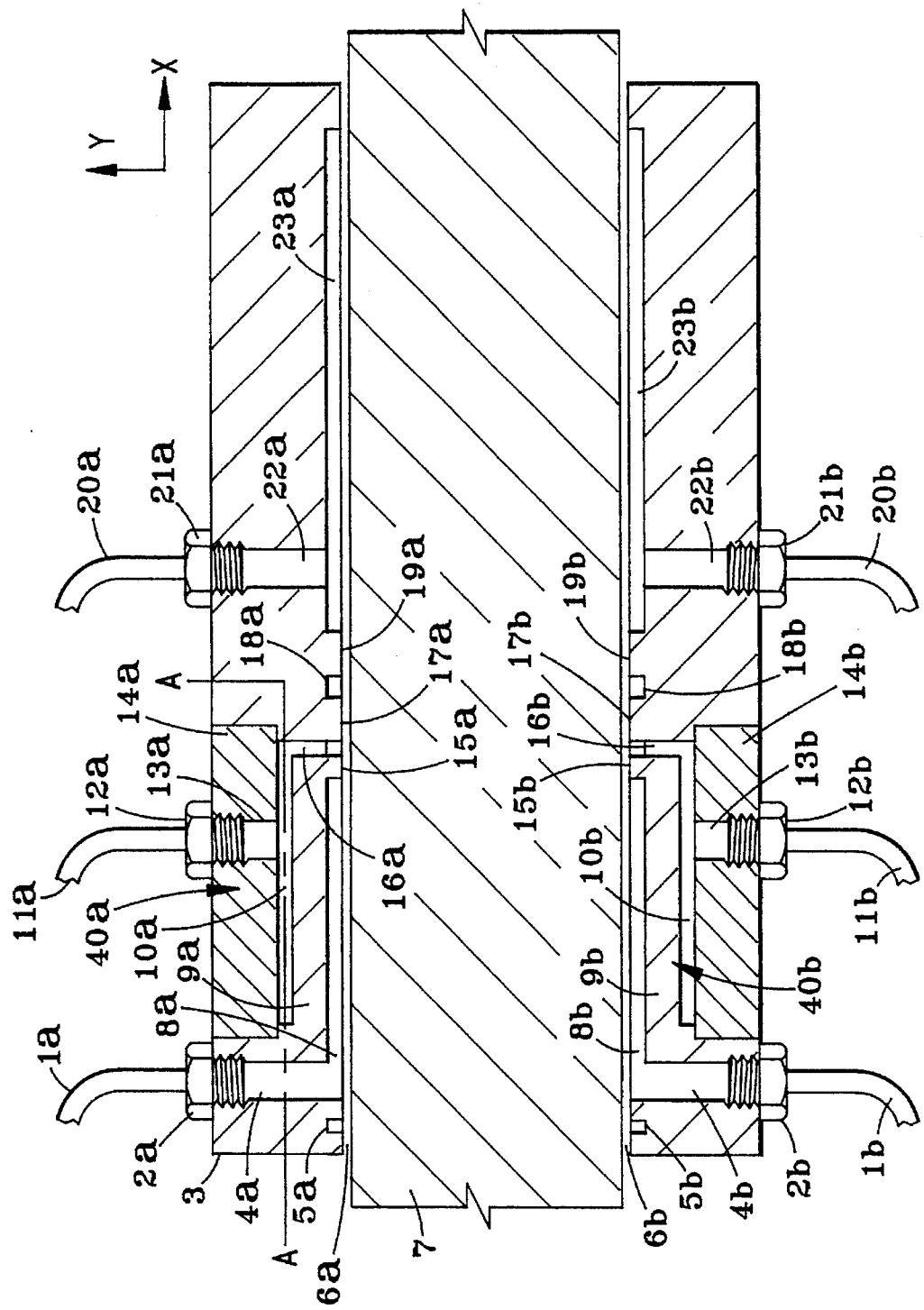
FIG. 1 is a side cutaway view of an elastically supported self-compensating flow-restricted bearing of the invention.
Figure 2:
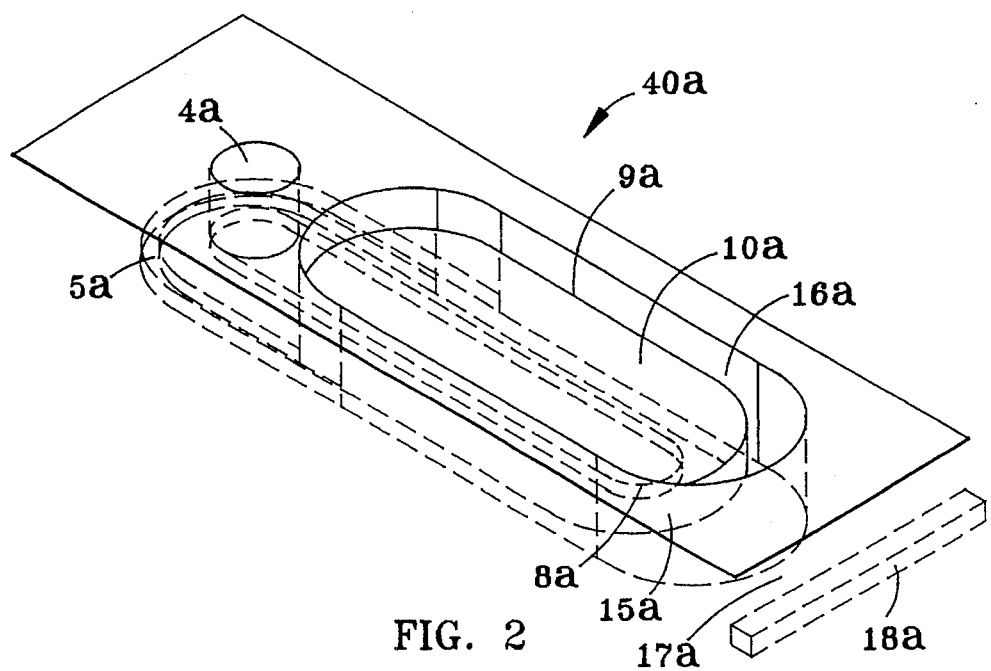
FIG. 2 is a partial cut-away isometric which shows the elastically supported self-compensating flow restrictor in greater detail.

FIGS. 1 and 2 illustrate a typical construction, in accordance with the invention, of an elastically supported self-compensating flow restrictor in a hydrostatic bearing which is drawn generically to represent either a linear (preferable in this representation) or a rotary application (the compensator would be turned 90 degrees but then would not be clear pictorially); and indeed the generic mathematical analysis detailed below that is required to tune the system is the same in either application.

In FIGS. 1 and 2, elastically supported self-compensating flow restrictors 40a and 40b are provided for hydrostatic bearings, such that when pressure is supplied to the bearing, the pressurized fluid from the source 11a and 11b substantially surrounds the self-compensating flow restrictor around its perimeter via grooves 16a and 16b and regions 10a and 10b behind the restrictors. The restrictors are elastically connected to the surrounding structure, by the effect of their structures acting as elastically supported cantilever members or tongues 9a and 9b, for example. In addition, the restrictors 40a and 40b are connected to opposed pockets 23b and 23a, respectively, and the pressure grooves 16a and 16b surround the restrictors 40a and 40b, which have central collector grooves 8a and 8b separated from the pressure grooves 16a and 16b by lands 15a and 15b. High pressure fluid flows from the supply grooves 16a and 16b across the lands 15a and 15b into the collector grooves 8a and 8b in proportion to the cube of the gaps 6a and 6b between the housing 3 and the rail 7. In the collectors 8a and 8b, the fluid flows to holes 4a and 4b through manifold means 2a and 2b and via hoses or manifold connection means 1a and 1b to the opposed pockets 23b and 23a via inputs 20b and 20a, in turn connected to manifold means 21b and 21a through holes 22b and 22a and into pockets 23b and 23a, respectively. Resistance to flow out of the pockets 23a and 23b is a function of the bearing gaps 6a and 6b and the pocket lands 19a and 19b. Flow is prevented from flowing unabated from the pressure supply grooves 5a and 5b, which are connected to their respective sources by slots 16a and 16b, by leakage lands 17a and 17b.

When a load is applied to the housing 3 containing the restrictor-pocket system in the negative Y direction, the pocket 23a and the adjacent restrictor 40a approach the rail 7 and the other pocket 23b and adjacent restrictor 40b move away from the rail 7. This causes the flow resistances across the pocket lands 19a and 19b to drain grooves 18a and 18b and flow resistances across the restrictor lands 15a and 15b from the pressure supply grooves 5a and 5b to collector grooves 8a and 8b to increase and decrease, respectively, (side "a" resistance increases and side "b" resistance decreases). This causes pressures in the pockets 23a and 23b to decrease and increase, respectively, while allowing flow from the compensator pressure supply grooves 5a and 5b to the collector grooves 8a and 8b to decrease and increase, respectively. This results in the pressure in the collectors 8a and 8b and their corresponding oppositely located pockets 23a and 23b decreasing and increasing, respectively.

Because the supply pressure that exists behind the elastically supported self-compensation structures 10a and 10b (which contain the collector grooves 8a and 8b) remains constant, and the pressure across the collector grooves changes, the self-compensating structures elastically deflect when the collector pressures change. The result is a deflection toward the rail 7 of the compensator 40a that feeds the pocket 23b that acts in the direction of the load, further decreasing the flow and hence the pressure to this pocket beyond what would normally be obtained by self-compensation means. Simultaneously, there results a deflection away from the rail 7 of the compensator 40a that feeds the pocket 23a that acts to oppose the load, which further increases the flow and hence pressure to the pocket 23a beyond what would normally be obtained by self-compensation means. Since the compensation for the hydrostatic bearings has taken place between the restrictors (compensators) 40a and 40b and the rail 7, the system is insensitive to manufacturing tolerances, and movement of the rail 7 relative to the housing 3 causes any dirt that is introduced into the system to be sheared away, providing a system that is self cleaning and therefore amenable to the use of water based fluids which normally breed bacteria and blobs that otherwise would block a normal restrictor such as a diaphragm, capillary or orifice, as before stated, but will not bother the self-cleaning system. When designed using mathematical optimization techniques, it becomes possible to tune the bearing with the elastically supported self-compensating flow restrictors to optimize stiffness, bearing size,, load capacity, or flow characteristics with far greater variances then would be possible with conventional self-compensation or elastic diaphragm means.

This design can be applied to modular bearing units that are individually attached to a carriage and then connected with hoses or manifolds; or the design can be applied in the form of a carriage that is a modular unit that, when used in sets, can be bolted to a machine axis to support said axis, with said modular carriage operating hydrostatically on modular rails to support loads in two directions, and with said rails bolted to a machine bed.

Figure 5:
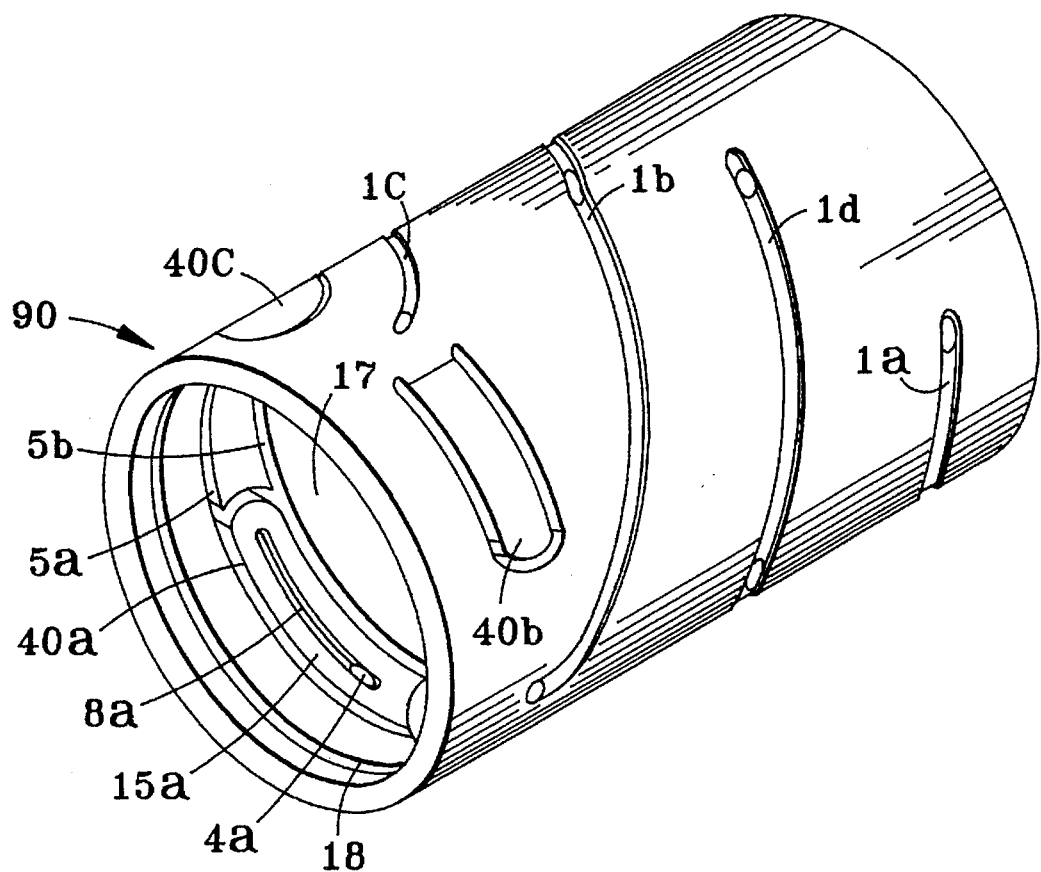
FIG. 5 is an isometric view of a bearing sleeve constructed to be pressed in a bore to receive a shaft or spindle.

FIG. 5 shows a sleeve 90, which would be pressed into a bore, for use of the invention with a shaft or a spindle. In this case, there is one continuous interconnected pressure supply groove, (5a and 5b), serving opposing pressure groove functions. Drain groove 18 removes fluid. Land 17 seals the pressure groove from the pockets (not shown here). The channels 1a, 1b, 1c and 1d, take the fluid from the respective collector grooves (only 8a, of which is shown) to corresponding pockets (not visible in this view). 40a, 40b, and 40c are the cantilevered elastically supported tongues or beams of the restrictor system. Fluid flows, for example, across compensator land 15a, is collected in groove 8a, and is channeled through hole 4a to groove 1a where it is then taken to the corresponding pocket opposed to the collector groove.

The mathematics of the system will now be considered in order to allow an engineer skilled in the art to utilize this technology. A self-compensating hydrostatic circuit is shown in FIG. 4, with two opposed pads that are integral to the carriage 3 and which are on opposites sides of the rail 7. Fluid is supplied at a given pressure by pressure supplying means 30 to a self-compensating hydraulic circuit. In the hydraulic circuit in FIG. 4, fluid flows through the lower restrictor 27b, then through the upper restrictor 28a, and exits the bearing at atmospheric pressure. Likewise, fluid flows to the upper restrictor 27a, then through the lower restrictor 28b, and exits the bearing at atmospheric pressure.

While this occurs, fluid flows out of the leakage land resistances 26a and 26b. Since the magnitude of these leakage resistances does not effect the pressure supplied to the restrictors 27a and 27b, these resistances have no effect on the operation of the self-compensating portion of the hydraulic circuit, which dictates the bearing stiffness.

Given the pressure in the upper and lower pad pockets, the force on the upper and lower pads is given by $$F_u = A_{ueff} P_{upad} \tag{1}$$

$$F_l = A_{leff} P_{lpad}, \tag{2}$$

where $A_{ueff}$ and $A_{leff}$ are the effective areas of the upper pad 28a, and the lower pad 28b, respectively, and are determined using methods described in the before-mentioned patents or in *Precision Machine Design* (Prentice Hall, Englewood Cliffs, N.J., 1992) by A. Slocum. The pressures in the upper and lower pad pockets are determined by the resistances in the hydraulic circuit $$P_{upad} = P_s \frac{R_{upad}}{R_{lres} + R_{upad}} \tag{3}$$

$$P_{lpad} = P_s \frac{R_{lpad}}{R_{ures} + R_{lpad}}. \tag{4}$$

In general, the resistance $R_i$ of fluid flowing between a surface "i" and a corresponding parallel surface, separated by the distance $h_i$, where $h_i$ is substantially small, is given by $$R_i = \frac{C_i}{h_i^3}, \tag{5}$$

where $C_i$ is the resistance constant associated with the surface "i", and the corresponding parallel surface.

Using Equations (1) through (5), the net force on the carriage can be derived in terms of the rigid body displacement of the carriage $\delta$ from an initial gap $h_o$, and the displacement associated with the upper and lower restrictors, given by $\delta_{ures}$ and $\delta_{lres}$, by virtue of force equilibrium of the carriage; i.e., $$F_{apl} = F_{upad} - F_{lpad} \tag{6}$$

$$F_{apl} = P_{supply} A_{ueff} \left( \frac{\frac{1}{(h_o + \delta)^3}}{\frac{\gamma_u}{(h_o + \delta_{lres})^3} + \frac{1}{(h_o + \delta)^3}} \right) - \tag{7}$$

$$P_{supply} A_{leff} \left( \frac{\frac{1}{(h_o - \delta)^3}}{\frac{\gamma_l}{(h_o + \delta_{ures})^3} + \frac{1}{(h_o - \delta)^3}} \right)$$

In Equation (7), the factors $\gamma_u$ and $\gamma_l$ are given by $$\gamma_u = C_{lres}/C_{upad} \tag{8}$$

$$\gamma_l = C_{ures}/C_{lpad} \tag{9}$$

where the constants $C_{lres}$, $C_{upad}$, $C_{ures}$, $C_{lpad}$, represent the resistance constants associated with $R_{lres}$, $R_{upad}$, $R_{ures}$, $R_{lpad}$, respectively. In a conventional self-compensating bearing, $\delta_{ures}$ and $\delta_{lres}$ are modulated only by the displacement of the carriage, $\delta$:

$$\delta_{ures} = \delta \tag{10}$$

$$\delta_{lres} = -\delta. \tag{11}$$

In the novel design of the present invention, the upper and lower restrictor gaps are modulated by the lower and upper pad pocket pressures, respectively, which are equal to the upper and lower collector groove pressures in the restrictors, respectively, as well as being modulated by the displacement of the carriage,$\delta$. In general, for the novel design of the invention, the upper and lower restrictor displacements are given by $$\delta_{ures} = f(P_{lpad}) + \delta \tag{12}$$

$$\delta_{lres} = f(P_{upad}) - \delta. \tag{13}$$

A new modulating effect is achieved by making the upper and lower restrictors substantially elastic, as before explained, so that as the pressure in the pocket that opposes a restrictor increases (causing the collector groove pressure in the restrictor to increase), the restrictor flexes away from the rail surface; and, equivalently, as the pressure in the pocket that opposes a restrictor decreases (causing the collector groove pressure in the restrictor to decrease), the restrictor flexes toward the rail surface, hence amplifying the self-compensating effect of the original self-compensating circuit. For the most general case, $f(P_{lpad})$ in Equation (12) is a non-linear function which increases when $P_{lpad}$ increases. (or, equivalently, decreases when $f(P_{lpad})$ decreases). For this general case, the restrictor is supported by what is known to those skilled in the art of spring design as a general strain softening or strain hardening non-linear spring. Likewise, $f(P_{upad})$ in Equation (13) is a function that increases when $P_{upad}$ increases (or, equivalently, decreases when $f(P_{upad})$ decreases), also representing a general non-linear spring. If the upper and lower restrictors are supported by linear elastic springs (such as formed by an elastomeric material or a beam or a diaphragm-like flexural spring), then $\delta_{ures}$ and $\delta_{lres}$ are given by $$\delta_{ures} = (C_{ue} P_{lpad} + \delta_{uo}) + \delta \tag{14}$$

$$\delta_{lres} = (C_{le} P_{upad} + \delta_{lo}) - \delta \tag{15}$$

where $C_{ue}$ and $C_{le}$ are proportionality constants that relate $P_{lpad}$ and $P_{upad}$ to the upper and lower deflections of the restrictors, respectively; and $\delta_{uo}$ and $\delta_{lo}$ are the initial displacements of the restrictors, relative to their respective pad faces, when no pad pressure is present. Using Equations (1)–(15), the applied force $F_{apl}$ on the carriage can be determined, given a displacement $\delta$ of the carriage, via an iterative, numerical solution process. Given the force $F_{apl}$ on the carriage, verses the displacement $\delta$ of the carriage, the bearing stiffness can be computed numerically by dividing the change in the applied force $F_{apl}$ by a change in the displacement of the carriage $\delta$. Since $\delta_{ures}$ and $\delta_{lres}$ are modulated by the lower and upper pad pocket pressures, respectively, in addition to the motion of the carriage, $\delta$, the stiffness of the novel system presented here will be higher than that of a conventional self-compensating bearing, whose restrictor resistances are only modulated by the motion of the carriage $\delta$.

In the graph of FIG. 3, the slope of the curves of the force vs. deflection graph represents the bearing stiffness. Curve 80 shows the prior art laminar flow (e.g., capillary) fixed restrictor performance, which is considerably poorer than the self-compensating bearing performance 60 of the prior referenced patents. With the elastically supported self-compensating restrictor supplement of the invention, as the tuning is effected in accordance with the above procedure, the stiffness is greatly increased as shown by curve 50, the degree of elasticity controlling the effective tuning in the region 70.

Further modifications of the invention will also occur to persons skilled in the art, and all such are deemed to fall within the spirit and scope of the invention as defined by the appended claims

What is claimed is:

1. A hydrostatic self-compensating bearing for a linear bearing rail or spindle shaft having, in combination, opposed fluid supply pressure and collector grooves and corresponding pockets interconnected so that when a load is applied, one pocket approaches the rail or shaft while the opposite pocket moves away therefrom, allowing flow from the corresponding opposite supply grooves to the corresponding collector grooves to increase and decrease, respectively, providing compensation; each fluid supply pressure groove surrounding a self-compensating flow restrictor, elastically connected with its surrounding structure, whereby, as the pressure in each collector groove and its oppositely located pocket increases and decreases, respectively, a change in the differential pressure across the elastically supported restrictors causes a deflection thereof respectively away from and toward the rail or shaft, further increasing and decreasing the pressure in the corresponding pocket to provide compensation supplemental to the first-named compensation.

2. A bearing as claimed in claim 1 and in which each flow restrictor is elastically connected to its surrounding structure by a cantilevered tongue.

3. A bearing as claimed in claim 1 and in which the restrictor is tuned to optimize hydrostatic bearing performance.

4. A bearing as claimed in claim 1 and in which each pressure groove-surrounded restrictor has a central collector groove separated from the pressure groove by lands, with the restrictor on one side being connected by tubing means to the opposed pocket and vice versa, such that when a load is applied to the restrictor-pocket system, one pocket and the adjacent restrictor approach the rail or shaft and the other pocket and adjacent restrictor move away from the shaft.

5. A bearing as claimed in claim 1 and in which the elastically supported self-compensation restrictor is elastically supported by elastic spring means, as of one of an elastomeric material, a beam, or a diaphragm-like flexural spring.

6. A bearing as claimed in claim 1 and in which the area behind the restrictor that is exposed to the supply fluid pressure is controlled to optimize performance.

7. A bearing as in claim 1 and in which the elastically supported self-compensating flow-restricted hydrostatic bearings support a round shaft for a spindle.

8. A bearing as in claim 1 and in which the elastically supported self-compensating flow-restricted hydrostatic bearings support a carriage on a bearing rail.

9. A bearing as in claim 8 and in which the carriage is a modular unit that when used in sets can be bolted to a machine axis to support said axis, with said modular carriage operating hydrostatically on modular rails to support loads in two directions, and with said rails bolted to a machine bed.

* * * * *